Aug. 21, 1962

E. G. ANGER ETAL 3,050,670

MOTOR CONTROL SYSTEM

Original Filed May 9, 1955

INVENTORS
ERNEST G. ANGER
DORN L. PETTIT
BY

*Myron J. Seibold*

ATTORNEY

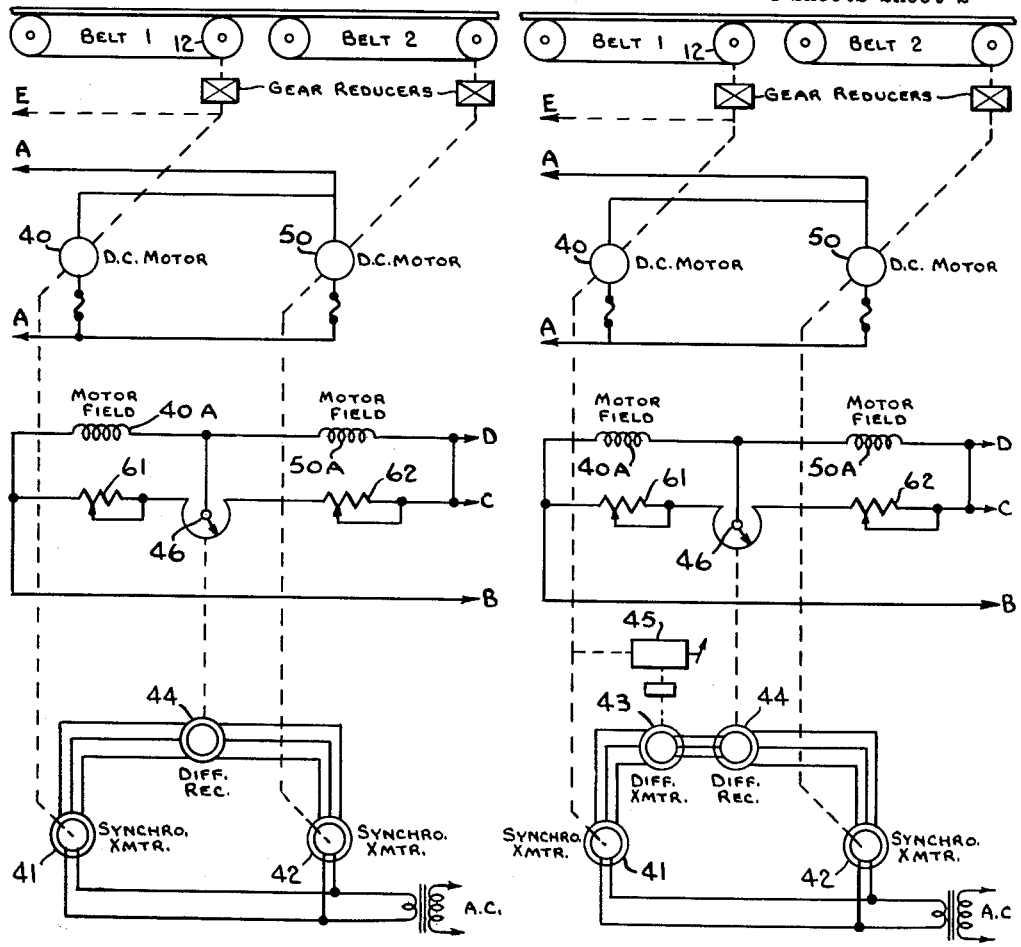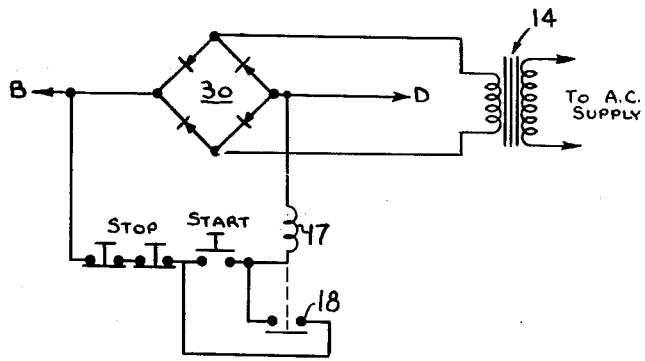
FIG. 3
FIG. 4
FIG. 5
INVENTORS
ERNEST G. ANGER
DORN L. PETTIT
BY
ATTORNEY INVENTORS
ERNEST G. ANGER
DORN L. PETTIT
BY
Myron J. Seibold
ATTORNEY Aug. 21, 1962    E. G. ANGER ETAL    3,050,670
MOTOR CONTROL SYSTEM Original Filed May 9, 1955    4 Sheets-Sheet 4

INVENTORS
ERNEST G. ANGER
DORN L. PETTIT
BY
Myron J. Seibold
ATTORNEY

United States Patent Office 3,050,670
Patented Aug. 21, 1962

3,050,670
MOTOR CONTROL SYSTEM
Ernest G. Anger and Dorn L. Pettit, Wauwatosa, Wis., assignors to Square D Company, Detroit, Mich., a corporation of Michigan
Original application May 9, 1955, Ser. No. 507,083, now Patent No. 2,885,616, dated May 5, 1959. Divided and this application Sept. 23, 1958, Ser. No. 762,770
6 Claims. (Cl. 318—72)

This invention concerns a novel electrical control system providing for the regulation of speed of two or more direct current motors, which operate a continuous conveyer belt line for the processing of various types of materials, such as, for example, plasterboard or wallboard and is a division of our application 507,083, filed May 9, 1955, now Patent 2,885,616.

It is an object of this invention to provide an adjustable control system for regulating a motor driven process line which incorporates speed regulation of a main generator by control of the excitation supplied thereto to operate the line at a preset speed, and in addition provides adjustable position control between sections of the line to accomplish section speed regulation under varying load conditions concurrently with line speed regulation.

A further object of the invention is to provide a control system for maintaining proper speed relationships between different sections of a continuous process line to compensate for motor speed and process material changes occurring along the line.

A still further object of the invention is to provide a method of synchronizing a shearing motor in the process line to the motion of the material by means of an electrical signal transmitted by a metering wheel driven by said line, with provision for introduction of an adjustable correcting slip to permit small corrections in the speed relationship.

A still further object of the invention is to provide an adjustable means to effect a speed percentage change between two section drive motors to compensate for different section requirements.

It is a still further object of the invention to provide for the regulation of two or more motors to exact coordination, or when necessary an adjustable speed difference, by continuously comparing their relative angular positions, obtained by comparison self-synchronizing devices cooperating with a motor field weakening potentiometer in a novel arrangement.

It is a still further object of the invention to provide for the regulation of a motor, as above, except instead of regulating through comparison self-synchronizing devices and a field weakening potentiometer, regulation is obtained through comparison self-synchronizing devices and a magnetic amplifier circuit.

It is a still further object of the invention to provide a motor speed control system in which the field windings of the motors are connected in series circuit relationship to minimize speed differences and the effect of temperature variations between the motors.

It is a still further object of the invention to provide for the regulation of position of one direct current motor by comparison of the angular position of said motor with the angular position of another direct current motor, or the angular position of a metering wheel in the process line.

These and further objects and features of the invention will be readily apparent to those skilled in the art from the following specification and appended drawings illustrating certain preferred embodiments in which:

FIG. 3 represents a combined block and schematic wiring diagram of the two representative belt sections of the control system.

FIG. 4 represents a combined block and schematic wiring diagram of two representative belt sections of the control system, similar to FIG. 3, but illustrating an added feature for effecting an adjustable speed difference between the respective sections.

FIG. 5 represents a schematic wiring diagram of the start and stop portions of the control system.

FIGS. 6, 7, 8, and 9 represent combined block and schematic wiring diagrams of two representative sections of the control system with alternative methods of regulation.

Figure 1:
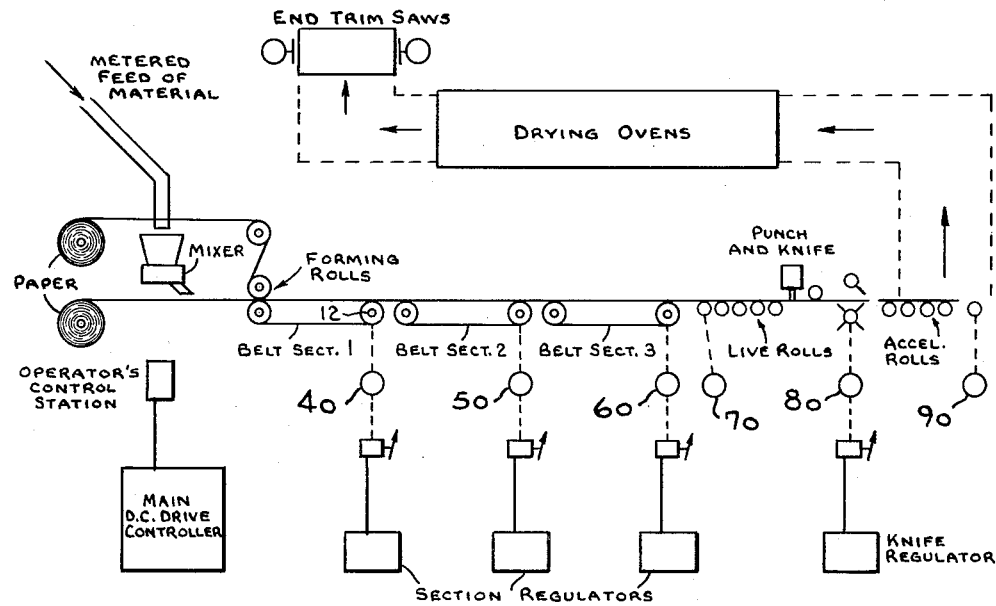
FIG. 1 represents a block diagram of a plasterboard conveyor belt process line.

This invention will be described in connection with a wallboard or plasterboard process line manufacturing system merely as a representative embodiment thereof. As illustrated in FIG. 1, the raw material for plasterboard manufacture is fed into a hopper and then into a mixer, where it is mixed with water to proper consistency in a mixing head and fed out onto a lower roll of paper. It then feeds through the forming rolls where the lower roll of paper is folded up and over the edges and the upper layer of paper is placed on top. As it passes through the forming rolls, the paper and mudlike material combination is reduced to the required thickness and glue is applied to the edge of the paper to secure the upper and lower parts together. It then feeds out onto the first belt section at a rate of speed which is adjustable on the machine, from 30 to 100 ft. per minute, for example. A plastic tape is fed under either side of the soft board to reduce the edge thickness so that in the construction of the home a piece of tape can be placed over the adjacent matching boards without being noticed. This plastic tape proceeds along the first two belt sections until the board begins to set. As the board passes along the first belt section, it is rather soft and pliable and does not set up to any degree of hardness until it is on the second belt section. On the third belt section it is somewhat harder and passes into the live roll section where it is exposed to air for drying of the underside. From here it passes into the punch and knife section.

The punch section is used to punch the holes in plasterboard only and is disengaged for the wallboard process. This punch punches the holes without interrupting the movement of the board. It is driven with elliptical gears so that the punch may enter the board and leave the board while the punch head is moving along the line at the same rate as the board.

The knife section consists of a lower knife 77 (FIGS. 6, 7, 8, and 9) with blades at 90° positions rotating in synchronism with the board. An upper knife 78 (FIGS. 6, 7, 8, and 9), consisting of a single blade, is arranged with a clutch and triggering mechanism to be brought into action by a chain and dog release (not shown), to cut the board to any desired length in multiples of 1 ft. from 4 ft. to 16 ft., for example. The board then passes on to an accelerating section and is fed out onto a reversing table, where it changes direction to feed through an oven line where curing takes place to harden and dry it. Tables at the outlet of the oven feed the boards through saws which trim and true the ends so that butt joints may be used in construction work. Packing and bundling then follows for warehousing and shipment.

Figure 2:
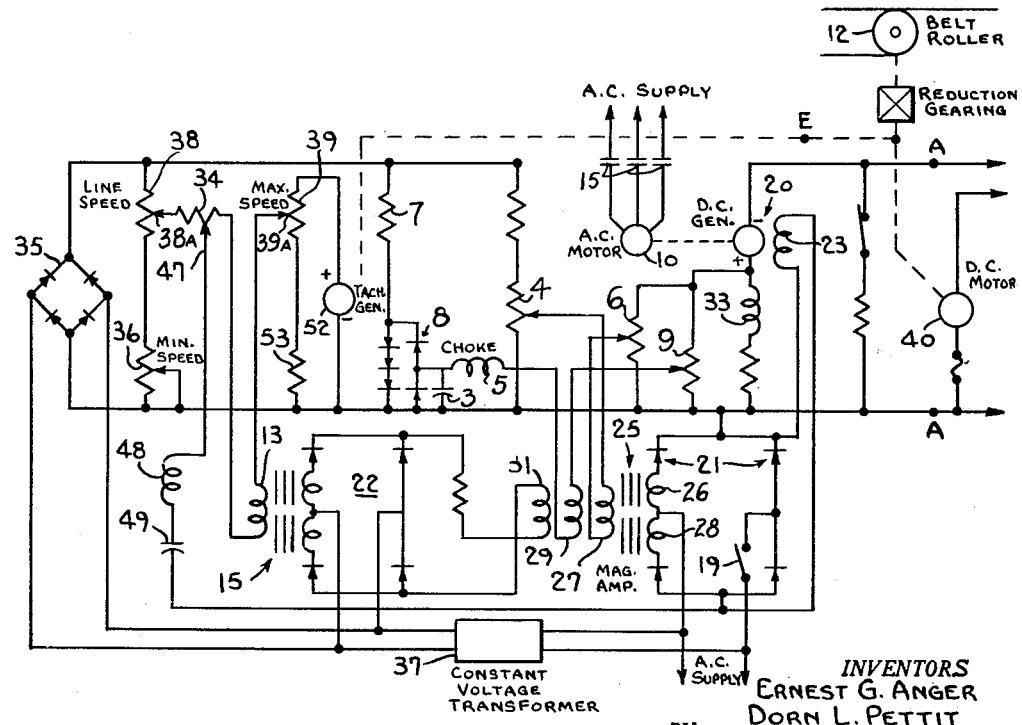
FIG. 2 represents a schematic wiring diagram of the main drive regulator portion of the control system.

Referring now to FIG. 2 in which is shown the main drive regulator circuit, an alternating current motor 10, connected to a source of A.C. supply, drives a direct current generator 20 upon closure of contactors 15 to provide a source of direct current supply for the motor armatures 40, 50, 60, 70, 80 and 90 through points A—A (FIGS. 2, 3, 4, 6, 7, 8, and 9). Note that these direct current drive motors 40, 50, 60, 70, 80 and 90 and their corresponding armatures bear the same numbers, as they are functionally identical for purposes of this description.

The main drive regulator circuit has an alternating current power supply which furnishes a relatively constant voltage through a constant voltage transformer 37 to a rectifier bridge 35. The bridge 35 supplies a relatively stable direct current voltage across the potentiometers 38 and 36 to provide a reference voltage for the main regulator circuit.

Contacts 19, controlled by relay 17 (FIG. 5), connect the alternating current power supply with a dry disc rectifier stack 21, which furnishes a direct current excitation voltage to the generator field winding 23. The rectifier stack 21 forms part of a magnetic amplifier circuit to be subsequently described. The rectifiers of stack 21 are connected in a bridge-arrangement with output windings 26 and 28 of a magnetic amplifier reactor unit 25 included in two legs of the stack 21. Control of the saturation of the iron in the core of reactor unit 25 provides control of the circuit and the D.C. voltage applied to the generator field 23 in a manner well known in the art.

A second saturable reactor 15 and its corresponding rectifier stack 22 form a second magnetic amplifier circuit which is connected in cascade, as the first stage, with the magnetic amplifier circuit of reactor 25 and stack 21 as the second stage. The direct current control winding 13 of reactor 15 is connected between a pair of potentiometers 38 and 39. The potentiometer 38 is connected to potentiometer 36 across the rectified output of rectifier 35 and permits a line speed adjustment of the reference voltage to be obtained. The potentiometer 36, in series with potentiometer 38, permits an adjustment for minimum speed. The potentiometer 39 connected in series with a resistor 53 and across the output of tachometer generator 52, permits an adjustment of the maximum speed in a manner to be subsequently described. A potentiometer 34, in series circuit with the control winding 13, has a slider 47 permitting adjustment of a damping signal voltage in a manner to be subsequently described.

The tachometer generator 52, electrically connected across potentiometer 39 and resistor 53, is mechanically coupled to the first belt motor 40 and furnishes an electrical output in direct proportion to the speed of said motor. It is not necessary that tachometer generator 52 be mechanically coupled to the first belt motor 40 but may be connected to any of the belt motors because its response is to be indicative of the actual speed of the line.

Referring now to FIG. 3, in which is shown, for example, the first two belt sections of the process line, the field winding 40A of motor 40 is connected in series with the field winding 50A of motor 50 and connected at points D and B to the direct current output of rectifier 30 (FIG. 5). In order to regulate one belt speed with respect to the next, all belt motor field windings 40A, 50A, and the field windings (not shown) of motors 60, 70 and 90 are placed in series with bridging resistors across each field to obtain speed control by field weakening. For example, only the field windings 40A and 50A are shown, because the other field windings are connected in the same manner. The adjustable bridging resistors 61 and 62 are connected in shunt circuit with the field windings to provide adjustable field weakening in conjunction with potentiometer 46 in a manner to be subsequently described.

The angular position of each motor armature, as well as the speed relationship of one section compared to the next, is controlled by the use of a differential control system which indicates the position and reflects the position and speed discrepancy between adjacent motors to vary the resistance in the field shunting circuits. In the following description and in the claims, reference is made to synchro transmitters and receivers. These are self-synchronizing devices commonly known as "Selsyns" or "Synchros" which are well known in the art. They may be connected either as transmitters (generators) to translate a mechanical indication reflecting a motor position into an electrical output, or as a receiver (motor) to translate an electrical indication into a mechanical output to change a position. A synchro transmitter 41, mechanically coupled to and driven by belt motor 40 to obtain an electrical voltage output indicative of the speed of said motor, is electrically connected to an A.C. supply source and has its electrical output connected to one side of a differential syncho receiver 44. A second synchro transmitter 42, mechanically coupled to and driven by belt motor 50, is electrically connected to the same alternating current supply source and has its electrical output connected to the other side of differential syncho receiver 44. The differential synchro receiver 44, operated in a reverse sense from the synchro transmitters 41 and 42, is connected in series circuit therewith and has for the utilization of its mechanical output a direct connection with a potentiometer 46. One arm of the potentiometer 46 is connected in the circuit of resistor 61 which shunts its associated motor field winding 40A while the other arm of the potentiometer 46 is in the shunting circuit of the succeeding section (resistor 62) of motor field winding 50A.

An alternate system is shown in FIG. 4 wherein a differential synchro transmitter is inserted in series circuit with the differential synchro receiver 44 and synchro transmitter 41 and is mechanically coupled to and driven by an adjustable means 45. The adjustable means 45 is an adjustable transmission device which is driven by a motor and in turn drives another device at any preselected speed difference. The adjustable transmission 45 is mechanically coupled to and driven by motor 40 and is adjusted to drive the synchro transmitter 43 at a reduced speed.

Figure 6:
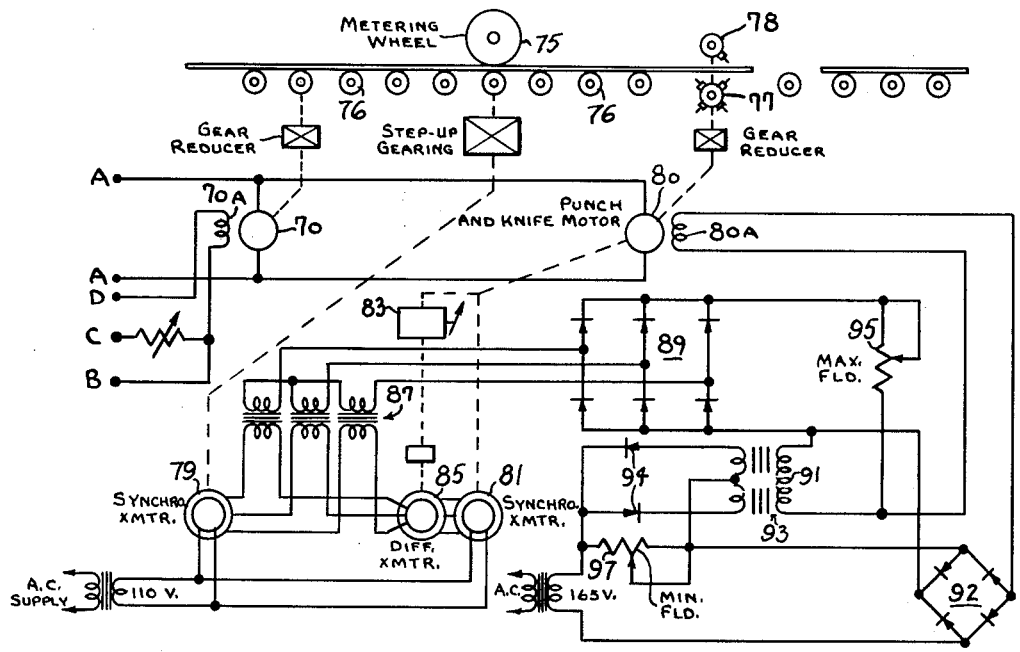

Referring now to FIG. 6 in which is shown the live roll section, its motor 70 and the punch and knife section and its motor 80. A synchro transmitter 79 is mechanically coupled to and driven by a metering wheel 75 which is provided to meter quantities of the prepared plasterboard into position for the subsequent punch and shearing operation. The synchro transmitter 79 is electrically connected across a source of alternating current supply and has its output electrically connected to comparison transformers 87. A synchro transmitter 81 is mechanically coupled to and driven by the punch and knife motor 80 and electrically connected across an alternating current supply and has its electrical output connected to a differential synchro transmitter 85. The differential synchro transmitter 85 has an adjustable transmission means 83 mechanically coupled to and driven by the knife motor 80. The adjustable transmission means 83 operates in a manner similar to the adjustable transmission means 45 to introduce a speed difference signal to the comparison circuit consisting of synchros 79, 81, 85 and transformers 87. The output of transformers 87 is connected to a magnetic amplifier circuit consisting of rectifier stack 89, saturable reactor 93 and rectifiers 94. A rectifier 92 connected across an alternating current power supply supplies a direct current excitation voltage to the field winding 80A of motor 80. An adjustable resistor 95 in the control signal circuit permits adjustment of the maximum signal current and, therefore, of the maximum current of field winding 80A, and thereby adjustment of the minimum speed of motors 80. An adjustable resistor 97 in series with the field rectifier 92 permits setting of the maximum field and, therefore, maximum speed of motor 80.

Figure 7:
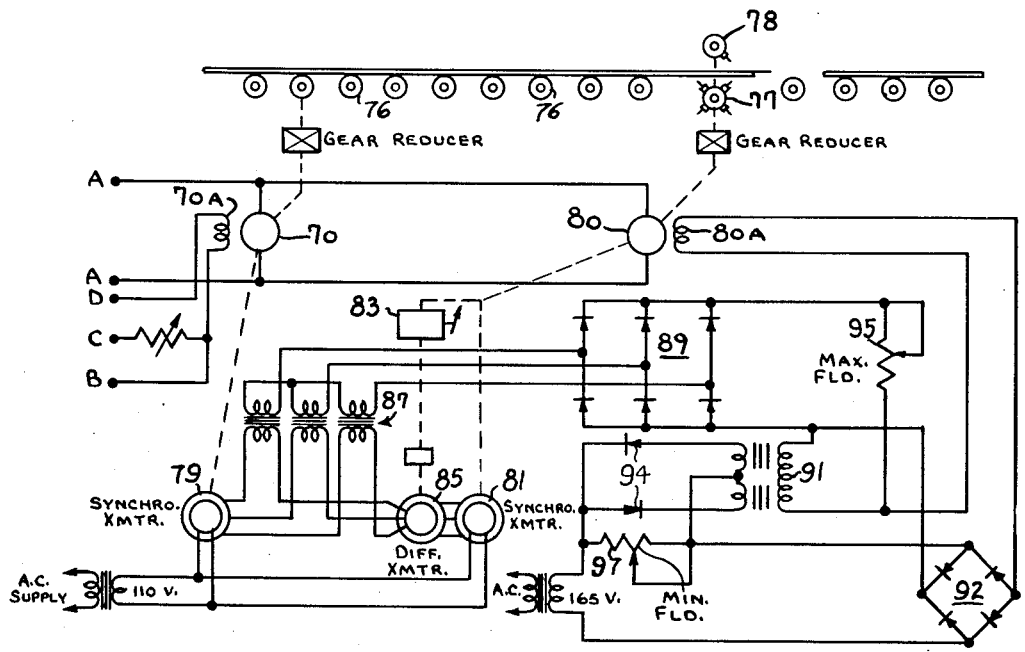

In FIG. 7 is shown a system similar to the system of FIG. 6 with an alternative method of regulation. In this system the synchro transmitter 79 is mechanically coupled to and driven by the live roll motor 70 instead of the metering wheel 75 of FIG. 6. The remaining components are identical to and operate in the same manner as the corresponding components of FIG. 6.

Figure 8:
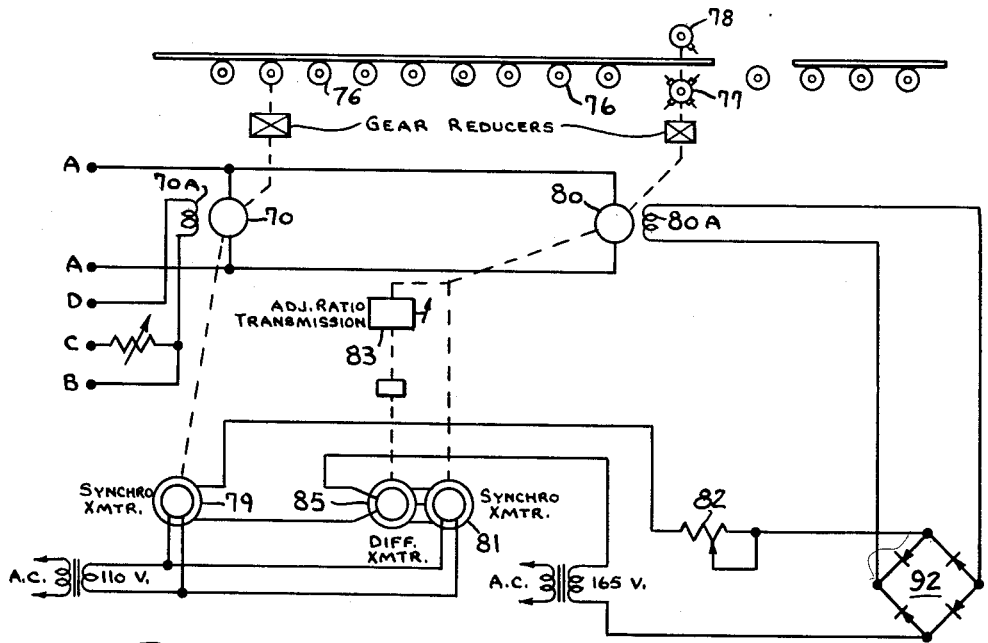
Figure 9:
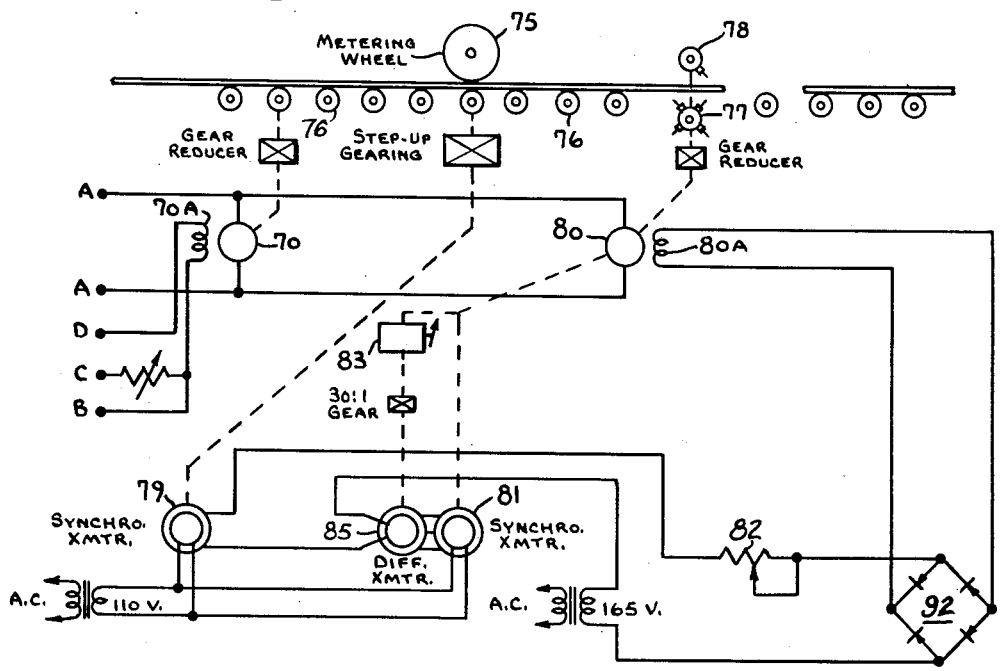

In FIG. 8, comparable to FIG. 7, and in FIG. 9, comparable to FIG. 6, the speed difference output of the synchros 79, 81 and 85 is connected directly to the rectifier bridge 92 through an adjustable rheostat 82. The remaining components are identical to and operate in the same manner as the corresponding components of FIG. 6, heretofore described.

Referring now to FIG. 5 in which is shown an alternating current supply transformer 14 which has its output connected to a rectifier bridge 30. The bridge 30 is connected at points B and D to supply direct current power to the field windings 40A, 50A, 60A, 70A, and 90A, as previously mentioned. A start and stop circuit is shown connected across the output of rectifier 30 and has a start relay 17 in series with the start and stop buttons. The relay 17 operates contacts 18, 19 and contactors 15. The latter two components are shown in their circuit relationships in FIG. 2.

Operation

In operation, closure of the start button energizes the relay 17 to close contacts 18 (which complete a holding circuit around the start button), closes contactors 15 and closes contacts 19 (FIG. 2). The closure of the contacts 19 energizes the main drive regulator circuit, and the clossure of contactors 15 starts the operation of the motor generator set (10—20). The motor 40 is regulated to a predetermined speed by variation of the excitation voltage applied to generator field winding 23, and because the output of generator 20 is connected in parallel with all the motor armatures 40, 50, 60, 70, 80, and 90, will thereby maintain approximate speed of all the drive motors. These speeds and relative positions of the motors are further regulated to exact synchronization by regulators to be described below.

It will be observed that the series connection of fields minimizes the effect of field resistance variations due to differences in temperature between the respective motors. Some of these motors might operate near ovens or in open sunlight, whereas others are in a fairly cool portion of the building. With the motor fields in series, the warm-up of any one field affects them all and thereby minimizes the effect, thus reducing the amount of regulating correction required by the control system.

With a preset speed position of potentiometers 36, 38 and 39 selected by the operator and rectifier 35 providing a relatively stable reference voltage at slider 38A, and prior to initial movement of motor 40, a relatively large voltage is reflected across the control winding 13 of saturable reactor 15 and a resulting high current therethrough. The output of the saturable reactor 15 is controlled by the direct current drawn through its control winding 13 and therefore with a high current, the output across the rectifier stack 22 is decreased and transmitted to the control winding 31 of saturable reactor 25. The rectified output of reactor 25 is applied across the field winding 23 of generator 20. This will initiate voltage increase of generator 20 when contact 19 closes in response to energization of its coil 17, and result in acceleration of the drive motors 40, 50, 60, 70, 80, and 90. The initial acceleration of motor 40 will be transmitted back through the mechanical coupling to the tachometer generator 52 where it is reflected in a feedback voltage signal across potentiometer 39 and resistor 53. The feedback voltage signal of tachometer generator 52 will oppose the reference voltage heretofore applied at potentiometer slider 38A and across the control winding 13.

The adjustment of the maximum speed potentiometer 39 causes the feedback voltage at maximum operating speed to be slightly greater than the voltage at potentiometer 38. This small difference is sufficient to maintain the flow of regulating control current. A strong regulating action is then provided, since a small deviation of tachometer voltage can cause a considerable change in control current (through winding 13) and magnetic amplifier output to accomplish a correcting change to the generator 20. Thus, when the preset speed of motor 40 is attained, the feedback voltage at potentiometer slider 39A will match the reference voltage at potentiometer slider 38A and will reflect its match across the control winding 13. The match of voltages then maintains the speed of motor 40 and its follower motors to the preset speed position.

In the event the operator changes the preset speed to accelerate or decelerate the process line, a damping effect is provided to prevent sudden speed changes. A potentiometer 34, in series circuit with the winding 13, has a slider 47 which permits adjustment of the damping signal voltage transmitted from rectifier 21 through capacitor 49, which is of a polarity to momentarily oppose any change of voltage produced by change of potentiometer. This may be further explained as follows: As the voltage applied to the field winding 23 increases, current drawn by the damping capacitor 49 through filter choke 48 causes a voltage drop across the damping potentiometer 34 which strongly opposes the voltage applied to the control winding 13 by the speed potentiometer 38. The rate of voltage increase and therefore the response is limited until the capacitor 49 is fully charged to thereby delay or dampen the speed change until tachometer feedback at the new voltage again matches the reference voltage. The choke coil 48 produces filtering of rectifier ripple components from this voltage. The effective new excitation voltage will be fed through a dual magnetic amplifier circuit for transmittal to the generator field winding 23 to provide amplified excitation voltage to change the speeds of the belt motors 40 etc. The sensitivity of the dual magnetic amplifier circuits permits full change of output with a fraction of a volt applied at the control winding 13.

A bias control winding 27 of saturable reactor 25 is connected across potentiometers 4 and 6. The potentiometer 4 is an adjustable bias resistor which is utilized to provide a bias for the saturable reactor 25 in its control characteristic in the desaturation direction. The potentiometer 4 is adjusted so that minimum output to the field winding 23 at correct required speed may be obtained with sufficient current, of saturating polarity, drawn through the control winding 31 to insure operation through a favorable range of the pre-amplifier (15 and 22) output characteristic. The bias current is not varied by change of the speed setting potentiometer 38 and, since the magnetic amplifier output is determined by the algebraic sum of all control ampere turns, this winding 27 merely shifts the curve of output versus control.

Also included in the bias winding circuit is an adjustable IR compensating potentiometer 6. This potentiometer 6 is connected across the generator commutating field 33, so as to receive a voltage drop which is proportional to the current load drawn by the motors 40, 60, 70, 80 and 90, and is of a polarity to reduce the bias current as the load increases. It is adjusted so that the resulting shift in the amplifier output characteristic by the change in bias current causes an increase in the amplifier output to the generator field 23 so as to raise the voltage applied to the motor armatures 40, 50, 60, 70, 80 and 90 enough to compensate for their resistance drop and armature reaction effect. This compensation reduces the required regulation of the magnetic amplifier circuit.

A control winding 29 of reactor 25 is connected in series with sections of a current limit rectifier 8 and a current limit potentiometer 9. The potentiometer 9 is connected across the generator commutating field 33, similarly to potentiometer 6, and has a voltage drop proportional to the generator armature current. A biasing current drawn through resistor 7 from the reference voltage supply causes a constant voltage drop to be maintained across the left section of rectifier 8. The polarities of this voltage are such as to prevent conduction through the remaining sections to the winding 27, connected at their junction. Filter choke 5 and capacitor 3 prevent rectification of harmonic voltages present in the winding 27. When accelerating or steady load conditions increase beyond the limit set by the slider of potentiometer 9, the bias voltage is exceeded and current is conducted through the single disc section of rectifier 8 to the resistor 7. This current flows through the winding 29 in a direction to decrease the saturation of the magnetic amplifier (25—21), and is strong enough to overcome the regulating action of the control winding 31, since the resistance in the current limit circuit is low. The generator field 23 is prevented from increasing too rapidly, or weakened, if necessary, so as to limit the current flow from the generator to the motor armatures until the motors 40, 50, 60, 70, 80, and 90 accelerate. When the speed increases to the preset value, the feedback of tachometer voltage permits the regulating windings 31 and 13, as heretofore mentioned, to resume control, and the generator armature current decreases to the amount required by the running load.

If the speed setting is decreased suddenly, decelerating current flows as voltage generated by the motors 40, 50, 60, 70, 80 and 90 exceeds that of the generator 20, and the voltage across potentiometer 9 reverses. The other section of rectifier 8 then conducts current through the winding 29 in the opposite or saturating direction, as soon as the threshold conduction potential is exceeded. The bias section of rectifier 8 is then by-passed. This saturating current through winding 29 prevents weakening of the field 23 too rapidly so that the decelerating current is limited to a low value until the new preset speed is attained.

The operation of the system for differential angular position and speed control will now be described, as illustrated in FIGS. 3, 4, 6, 7, 8, and 9. The differential speed regulating system is provided to hold the relative angular position relationship between the three belt section motors 40, 50, and 60 and the live roll motor 70 in close synchronization for any selected line speed. The system also permits independent adjustment of the slip between successive sections to insure that proper tension is maintained at every portion of the wet plasterboard as it travels from the forming rolls to the roll table. In FIGS. 3 and 4, with the process line in operation, a motor speed difference between motors 40 and 50, occasioned by changing load characteristics of the plasterboard material, necessitates individual motor speed correction to maintain smooth and continuous operation of the process line. In this event the angular position of each motor armature is compared by its corresponding synchro transmitter. Because the synchro transmitters 41 and 42 are directly coupled to and driven by their corresponding motors 40 and 50, any angular displacement between the motors 40 and 50 will result in a corresponding angular displacement between the rotors of synchro transmitters 41 and 42. Also, because the differential synchro receiver 44 is connected in series with the transmitters 41 and 42, any change in their angular displacement will be communicated as a voltage to the receiver 44, with polarity according to the transmitter having the greater speed. The synchro receiver 44 will then rotate to move the potentiometer 46 a small distance to provide the corrective field weakening necessary to bring the motors 40 and 50 into synchronization. Obviously, if no angular displacement exists between the motors 40 and 50, indicating proper speed relationships, no voltage will be present at receiver 44 and it will be at rest until an unbalance is indicated and it again moves to correct the unbalance.

In some instances it may be desired to slightly increase or decrease the speed of one motor in relation to the next by introducing a set percentage of slip to accommodate, for example, difference in the belt drive pulleys and shrinkage or expansion of the plasterboard. This may be obtained (FIG. 4) by the use of the adjustable transmission means 45 and a differential synchro transmitter 43 to introduce a speed correction difference. The operator, after determining that one motor is leading or lagging its adjacent motors, makes an initial manual adjustment on the adjustable transmission 45 which introduces a mechanical speed difference to the differential transmitter 43. To compare with the speed of synchro transmitter 41, the synchro transmitter 42 must then run at a speed which equals the speed of motor 40 plus the differential introduced by the speed difference synchro transmitter 43. If this condition is not maintained, the difference synchro transmitter 43 will rotate and introduce a correction signal through its differential synchro receiver 44 and thereby to the potentiometer 46, which will correct the speeds of the two motors until the difference synchro transmitter 43 comes to rest, whereupon the speed of motor 50 will equal that of motor 40 plus the speed difference fed in. Note that in FIG. 3 the position difference between the synchros 41 and 42 is directly connected by the synchro receiver 44 to the potentiometer 46 to provide a synchronous position correction system, without providing for a speed difference system as shown in FIG. 4. Resistors 61 and 62 on either side of the synchro driven potentiometer 46 permit adjustment to limit the field control range as well as center the normal operating position of the potentiometer 46. This adjustable setting, by providing an operating range, prevents excessive weakening of the field which it shunts to prevent any dangerous rise in motor speed.

Note that the position difference control of this system obtains the best possible results because initially the plasterboard is so soft that tension between belts 1 and 2 must be held so low as to cause a regulating problem and there is considerable change in the length of the board as it progresses through its curing cycle so that the board is always swelling or shrinking as it proceeds along the belt line. These positions of swelling or shrinking are not stable points along the line, but vary with the speed of the line and quality of the mix being used. Other conditions, such as temperature and humidity, also affect this curing cycle. Therefore, these considerations require the use of motor position difference control to obtain proper regulation of the process line. Of particular importance in observing this system is that the regulated difference in speed of the belt sections is a preset small proportion of the overall line speed, for example, the adjustable ratio transmission 45 of FIG. 4 has an accuracy of a small fraction of 1% of its maximum setting and is geared to provide a 3% maximum correction at that setting. The maximum differential error therefore that the regulator can permit is less than .03%. Since the synchros are driven with sprocket gears (not shown), no further inaccuracy would be introduced because of slip.

One of the objects of the invention was to provide precise shearing or cutting of the board lengths. This object is obtained by providing a metering wheel 75 (FIGS. 6 and 9) which meters the quantity of board coming off the live rolls 76 into position near the rotary knives 77 and 78. The knife motor armature 80 is powered from the same voltage (generator 20) as the preceding and succeeding motors, and therefore tends to run approximately in proper speed relationship with the other drive motors for all speed settings. To provide close control of the cutting or shearing operation, faster regulation of the knife section is required. This is obtained by a rapidly acting position regulating system, which holds the speed of knife motor 80 in exact synchronization with the plasterboard line speed by set adjustment of its speed through control of field 80A. A magnetic amplifier circuit in FIGS. 6 and 7 improves the speed of regulation by providing a field forcing effect. In FIG. 6, the metering wheel 75 controls the field winding 80A through the magnetic amplifier by its coupled synchro transmitter 79 which gives a direct measurement of the movement of the board. This system is similar to the belt motor regulators heretofore described, in that position synchro transmitters 79 and 81 are employed in connection with the metering wheel 75 and the knife motor 80 respectively, with a speed difference being fed in by an adjustable transmission 83 to a synchro transmitter 85. However, a different method is employed to regulate the field winding. A voltage output from the synchro 79, reflecting the relative position of metering wheel 75, is compared with the voltage output of synchro 81, reflecting the relative position of knife motor 80, modified by the small difference voltage of the speed difference synchro 85 which reflects the speed difference required. The voltage difference in the electrical signals transmitted to the synchro combination 81—85 driven by the motor 80 and the synchro 79 driven by either the metering wheel 75 (FIG. 6) or the motor 70 (FIG. 7) is compared by three transformers 87 connected between synchros 79 and 85. The output of these transformers 87 is combined and rectified through rectifier stack 89 to provide a direct current signal through the control winding 91 of the magnetic amplifier system. This current is approximately proportional over the range of regulation to the instantaneous difference in angular positions of the synchros 79 and 81 plus the adjustable speed difference provided by transmitter 85. To provide the maximum possible speed of response, which requires overcoming the highly inductive field winding 80A, direct feedback of the current of field winding 80A is employed. This is accomplished by connecting the control winding 91 so as to receive a current which is the difference between the control signal output and the current of field 80A, both of which are several times that required to change the conduction of the saturable reactor 93. The magnetic amplifier circuit and its saturable reactor 93 then automatically is required to regulate its output current through the field 80A at a value slightly greater than the signal current, by the amount required by the control for that output. When the minimum and maximum field adjustment resistors 95 and 97 are properly adjusted, the rectified signal is strong enough to overcome the field current feedback. It is then able to exert considerable forcing action to accomplish a change in the field current quickly, since a small discrepancy in the difference between the signal and feedback currents is able to swing the amplifier saturation completely to either end of its range temporarily until the required change of current is accomplished. With this system, the speed of knife motor 80 can be changed rapidly with respect to the line speed by small and accurate amounts through use of the adjustment on the speed difference transmission. In this way the length of board passing through the knife between cuts can be controlled accurately.

In FIG. 7 the same system is used, except that the position signal from the acceleration belt motor 70 is communicated to the synchro 79 instead of the signal from the metering wheel 75 which may be omitted. This system then regulates the motors 70 and 80 to maintain synchronization between the two sections.

In FIG. 8, comparable to FIG. 7, and FIG. 9, comparable to FIG. 6, the position difference signal is fed directly to a rectifier bridge for transmittal to the knife motor 80A without amplification as a more economical method of modification but without field forcing action. In all other respects the components of the systems of FIGS. 7, 8, and 9 are identical in kind and operation to the components of the system of FIG. 6 heretofore described.

In the following claims, reference is made to "position responsive means" and "differential means" which are contemplated to include mechanical equivalents for the synchro transmitters (position responsive means) and the differential synchro receivers (differential means). Obviously, where location distances are not a factor, a mechanical coupling, such as a flexible shaft, may be inserted between the motor 40 and a differential transmission device, such as differential gears, and a second flexible shaft connecting motor 50 and the same transmission device to produce a mechanical output driving the potentiometer 46 in proportion to the angular position or speed variation existing between the motors. In essence, such a mechanical system would be very practical where the belt motors 40 and 50 are located within short distance of each other. In the particular application disclosed in this invention, distances between motors 40 and 50 of several hundred feet are required which necessitates electrical coupling as a more pracical method of application.

Therefore, while certain preferred embodiments of the invention have been disclosed, it is understood that the invention is not limited thereto, as many variations will be readily apparent to those skilled in the art and the invention is to be given its broadest possible interpretation within the terms of the following claims.

What is claimed is:

1. In a motor regulating system, a plurality of direct current motors, a first direct current source for supplying power to the armatures of said motors, said armatures connected in parallel circuit with each other and said source, a second source of direct current supply, field windings for said motors connected in series circuit with each other and said second source, a synchro transmitter for each motor and mechanically coupled thereto to provide an electrical response representative of the angular position of said motor, variable resistance means in shunt circuit with at least one of said field windings to vary the resistance thereof, a synchro receiver in series circuit between two of said synchro transmitters to receive and compare their electrical outputs and to provide an output representative of the difference therebetween, said synchro receiver mechanically coupled to said resistance means to vary the current through said field windings in relation to said output difference.

2. In a motor regulating system, a pair of direct current motors, a direct current source connected to the armatures of said motors, field windings for each of said motors, said field windings being connected in series with each other, a position responsive means for each motor mechanically coupled thereto to provide an output representative of the angular position of its motor, a variable resistance means in shunt circuit with at least one of said field windings to vary the resistance thereof, a differential means interposed between two of said position responsive means to receive and compare their respective outputs, an adjustment means mechanically coupled to one of said motors and said differential means to furnish an adjustable relative difference between outputs of said two position responsive means, said differential means mechanically coupled at its output to said resistance means to vary the relative current through said field windings to maintain said motors at the adjustable speed difference.

3. In a motor regulating system, a first direct motor, a second direct current motor, a motor-generator set driving said motors at a predetermined speed, a first field winding for said first motor, a second field winding for said second motor, a source of direct current supply providing a constant excitation voltage for said field windings, said field windings connected in series circuit to said source, variable resistance means connected in shunt circuit with said field windings and having a connection to a point between said field windings, a first position responsive means associated with said first motor, a second position responsive means associated with said second motor, said first and second position responsive means connected to a differential means to provide a comparison output when one of said motors varies from said predetermined speed as reflected by a corresponding angular position variation, means movable in response to said comparison output to move said variable resistance means in accordance therewith to change the shunting resistance in the circuits to said field windings whereby said motors are maintained in speed synchronization with each other at said predetermined speed.

4. In a motor regulating system, a plurality of direct current motors, a motor-generator set providing electrical power to the armatures of said motors, a source of direct current supply, field windings for said motors connected in series circuit with each other and said source, a position responsive means connected to each of said motors to provide an output representative of the position of said motor, a variable resistor in shunt circuit with at least one of said motor field windings to vary the current therethrough, differential means connected to two of said position responsive means to furnish an output difference, said differential means being mechanically coupled to said resistor to vary the resistance thereof in relation to the relative position of the motors affecting said two position responsive means.

5. In a motor regulating system, the combination comprising, a plurality of direct current motors each having a field winding connected in a series circuit with the field windings of the other motors, transmitting means mechanically coupled to at least two of the motors to provide an electrical output representative of the angular position thereof, a variable resistance in shunt circuit with the field winding of at least one of the two motors to vary the resistance of the field winding, a receiver in electrical circuit with the transmitting means of the two motors to receive and compare their electrical outputs and to provide an output representative of the difference therebetween, and a connection between the receiver and said resistance to vary the resistance in relation to the output of the receiver.

6. In a motor regulating system, a pair of direct current motors to be regulated at a predetermined speed difference, a source connected to supply the armatures of the motors with current, field windings for each of the motors connected in a series circuit with each other and a second current source, a position responsive means for each motor mechanically coupled thereto to provide an output representative of the angular position of the motor connected therewith, means for varying the relative impedance of the field windings of the motors, an adjustment means mechanically coupled to one of the pair of motors and connected to receive and adjust the output of the position responsive means connected with the said one of the pair of motors and to provide an output adjustably different than the output of the position responsive means connected therewith and a differential means interposed between the adjustable means and the position responsive means connected with the other of said pair of motors to receive and compare their respective outputs and provide an output representative of the difference therebetween, said differential means being mechanically coupled to the means for adjusting the relative resistance of the field windings to vary the current through the field windings to maintain said motors at an adjusted speed difference.

References Cited in the file of this patent

UNITED STATES PATENTS

| | | |
|---|---|---|
| 2,451,946 | Harris | Oct. 19, 1948 |
| 2,735,059 | Schaelchlin | Feb. 14, 1956 |
| 2,799,817 | Matthes et al. | July 16, 1957 |
| 2,858,493 | Hull et al. | Oct. 28, 1958 |
| 2,882,474 | Bessire | Apr. 14, 1959 |

FOREIGN PATENTS

| | | |
|---|---|---|
| 853,962 | France | Dec. 23, 1939 |